United States Patent
Kopacz et al.

(10) Patent No.: US 7,626,762 B2
(45) Date of Patent: Dec. 1, 2009

(54) JOG ZONE FREE FIBER OPTIC COIL

(75) Inventors: Stanislaw Kopacz, Phoenix, AZ (US);
Joseph M. Rivera, Glendale, AZ (US);
Michael D. Sardinha, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 220 days.

(21) Appl. No.: 11/939,365

(22) Filed: Nov. 13, 2007

(65) Prior Publication Data
US 2009/0122318 A1    May 14, 2009

(51) Int. Cl.
G01C 19/72    (2006.01)
G02B 6/00    (2006.01)
G01P 3/00    (2006.01)

(52) U.S. Cl. .................. 359/465; 385/12; 73/504.01
(58) Field of Classification Search ................ 356/459, 356/465; 385/12; 73/504.01
See application file for complete search history.

(56) References Cited

U.S. PATENT DOCUMENTS

| | | | |
|---|---|---|---|
| 4,743,115 A | | 5/1988 | Arditty et al. |
| 4,793,708 A | * | 12/1988 | Bednarz ..................... 356/465 |
| 5,351,900 A | | 10/1994 | Torney |
| 5,475,774 A | | 12/1995 | Goettsche et al. |
| 5,506,923 A | | 4/1996 | Goettsche et al. |
| 5,781,301 A | * | 7/1998 | Ruffin ........................ 356/465 |
| 6,005,665 A | * | 12/1999 | Shannon et al. ............. 356/465 |
| 7,477,806 B2 | * | 1/2009 | Williams ..................... 385/12 |
| 2008/0130010 A1 | * | 6/2008 | Williams ..................... 356/465 |

FOREIGN PATENT DOCUMENTS

| | | |
|---|---|---|
| EP | 0292103 | 11/1988 |
| EP | 0616196 | 9/1994 |

* cited by examiner

*Primary Examiner*—Patrick J Connolly
(74) *Attorney, Agent, or Firm*—Fogg & Powers LLC

(57) ABSTRACT

A fiber optic coil assembly and a method of winding the same include a fiber optic coil configured to eliminate a jog zone, which is found in conventionally fiber optic coil assemblies and tends to weaken the coil. The fiber optic coil assembly includes at least two layers of coil. A first layer is cylindrically wound in a first rotational direction and in a first linear direction and includes coil diameters located substantially parallel to one another and extending over the first linear direction. A first lead portion extends from an end of the first layer through an opening defined by the wound first layer. A second layer is formed in a similar manner as the first layer, except it is wound in an opposite rotational direction. Additional layers may be included consistent with the winding process of the first or the second layer, respectively.

20 Claims, 2 Drawing Sheets

JOG ZONE FREE FIBER OPTIC COIL

BACKGROUND OF THE INVENTION

Winding processes for fiber optic coils used in fiber optic gyroscopes have conventionally included a so-called "jog zone" or "cross-over zone" region, which is the region in each layer of the winding pattern where fibers cross each other instead of laying parallel to one another. Generally, the jog zone is the weakest region of the wound fiber optic coil, where the weakest region refers to mechanical, thermal and optical weaknesses of the wound fiber optic coil.

One type of winding process for a fiber optic coil used in a fiber optic gyroscope is described in U.S. Pat. No. 6,005,665 (the '665 patent). The '665 patent describes a fiber optic gyroscope having an improved winding transition section otherwise known as a "jog zone". The improved jog zone reduces losses due to micro-bends and cross-coupling in the fiber optic coil. The reduced losses enable a more accurate measurement of rotation rate of the fiber optic coil, while minimizing unwanted phase-shifts that can cause false readings in the fiber optic gyroscope. Further, the '665 patent teaches that the jog zone of the fiber optic coil should consist of only 5% to 10% of the entire winding of the coil.

Fiber optic gyroscopes are used for detection of rotation particularly in navigation systems such as those used in aircraft and spacecraft. Fiber optic gyroscopes are desirable due to the high-level of accuracy and reliability of sensing inertial rotation rate that they possess.

Fiber optic gyroscope technology is well known in the industry. In a fiber optic gyroscope, light from a laser or some other light source is divided into two separate beams by means of a fiber optic coupler and then coupled into the two ends of a multi-turn coil of optical fiber. The fiber optic cable may consist of many of the standard types commercially available on the market. Light that emerges from the two fiber ends is combined by the fiber optic coupler and detected by a photodetector.

The fiber optic gyroscope senses rotation rate by detection of a rotationally induced phase shift between the light beams that propagate in opposite directions around the coil of the fiber optic cable. The signal that is detected corresponding to the phase difference between the counter-propagating beams is typically subjected to some form of phase modulation. The photodetector converts the modulated light beam to an electrical signal that corresponds to the rate of rotation of the coil of optical fiber. The signal is processed to provide a direct indication of the exact rate of rotation of the coil of optical fiber that has occurred.

Other physical phenomena may contribute to phase differences between the counter-propagating light beams than the mere physical rotation of the fiber optic gyroscope. Some of the most common performance limiting phenomena includes: micro-bends in the fiber within the wound coil; polarization cross-coupling of the light within the coils; and most notably, the inconsistencies due to the winding process of the coil.

Losses due to micro-bends or any non-orthogonal relationship, between symmetrical points in the fiber optic coil and the center axis of the fiber optic coil are exacerbated by external temperature variations. When a thermal gradient passes through a fiber optic coil, the change in temperature produces a change in the refractive index of the material from which the fiber is made. An asymmetrical change in the refractive index of the fiber will cause a phase shift between the clockwise and counterclockwise paths of the rotating beams of light passing through the coil. Cross-coupling of the polarization states within the coil may also cause unwanted phase shifts.

Furthermore, when the winding process of the coil is more difficult, the machines used for winding the coil are more difficult to automate and maintain the precision winding pattern without excessively stressing the fiber. A poorly wound coil may result in the loss and polarization cross-coupling discussed above. If these external phenomena are introduced into the gyroscope, the unwanted phase shifts or losses cause the fiber optic gyroscope to indicate false measurements that translate into false readings of rotation rate.

The largest contributor to these losses and phase shifts occur in the region of the coil where each turn makes a transition to the next turn or wind, which was referred to above as the "jog zone" or "cross-over zone." In the past, the length of the jog zone was kept to a minimum.

BRIEF SUMMARY OF THE INVENTION

The present invention generally relates to a winding pattern for a fiber optic coil configured to substantially eliminate and preferably completely eliminate a jog or cross-over zone that has commonly been associated with the process of winding a fiber optic coil.

In one aspect of the invention, a fiber optic coil assembly includes a first layer of a continuous fiber optic coil cylindrically wound in a first rotational direction and in a first linear direction, the first layer having coil diameters located substantially parallel to one another and extending substantially over the first linear direction, the first layer having a first lead portion extending from an end of the first layer and back through a cylindrical opening defined by the cylindrically wound first layer; and a second layer of a continuous fiber optic coil cylindrically wound in a second rotational direction and in the first linear direction, the second layer having coil diameters located substantially parallel to one another and extending substantially over the second linear direction and further located on the first layer, the second layer having a second lead portion extending from an end of the second layer and back through a cylindrical opening defined by the cylindrically wound first layer.

In another aspect of the invention, a method for winding a fiber optic coil assembly includes cylindrically winding a first layer of a continuous fiber optic coil in a first rotational direction and in a first linear direction such that coil diameters comprising the first layer are located substantially parallel to one another and extend substantially over the first linear direction; routing a first lead portion from an end of the first layer through a cylindrical opening defined by the cylindrically wound first layer; cylindrically winding a second layer of the continuous fiber optic coil in a second rotational direction and in the first linear direction such that coil diameters comprising the second layer are located substantially parallel to one another and extend substantially over the first linear direction; and routing a second lead portion from an end of the second layer through the cylindrical opening defined by the cylindrically wound first layer.

In yet another aspect of the invention, a fiber optic gyroscope having a fiber optic coil assembly includes a fiber optic coil having a first layer and a second layer, the first layer cylindrically wound in a first rotational direction and in a first linear direction, the first layer having coil diameters located substantially parallel to one another and extending substantially over the first linear direction, the first layer having a first lead portion extending from an end of the first layer and back through a cylindrical opening defined by the cylindrically wound first layer, and the second layer cylindrically wound in a second rotational direction and in the first linear direction, the second layer having coil diameters located substantially parallel to one another and extending substantially over the second linear direction and further located on the first layer, the second layer having a second lead portion extending from an end of the second layer and back through a cylindrical opening defined by the cylindrically wound first layer.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

In the following description, certain specific details are set forth in order to provide a thorough understanding of various embodiments of the invention. However, one skilled in the art will understand that the invention may be practiced without these details or with various combinations of these details. In other instances, well-known structures and methods associated with fiber optic gyroscopes and fiber optic coils, to include winding processes and method associated with fiber optic coils may not be shown or described in detail to avoid unnecessarily obscuring descriptions of the embodiments of the invention.

The following description is generally directed to a "jog zone" free fiber optic coil for a fiber optic gyroscope and methods of winding the fiber optic coil to eliminate the jog zone. One purpose of at least one aspect of the invention is to eliminate cross over of portions of a fiber optic coil during a winding process. Another purpose is to ensure a continuous parallel winding of the fiber optic coil on every layer and throughout a cylindrical structure of the wound fiber optic coil. In view of the aforementioned purposes, the fiber optic coil may be wound in a variety of winding patterns to include, but not limited to, desired patterns such as an end-to-end pattern, a quadruple pattern, an octupole pattern, etc. Forming the fiber optic coils without the jog zone may advantageously ensure an improved mechanical structure, more uniform thermal characteristics, and may provide similar or improved optical performance for the fiber optic gyroscope.

Figure 1:
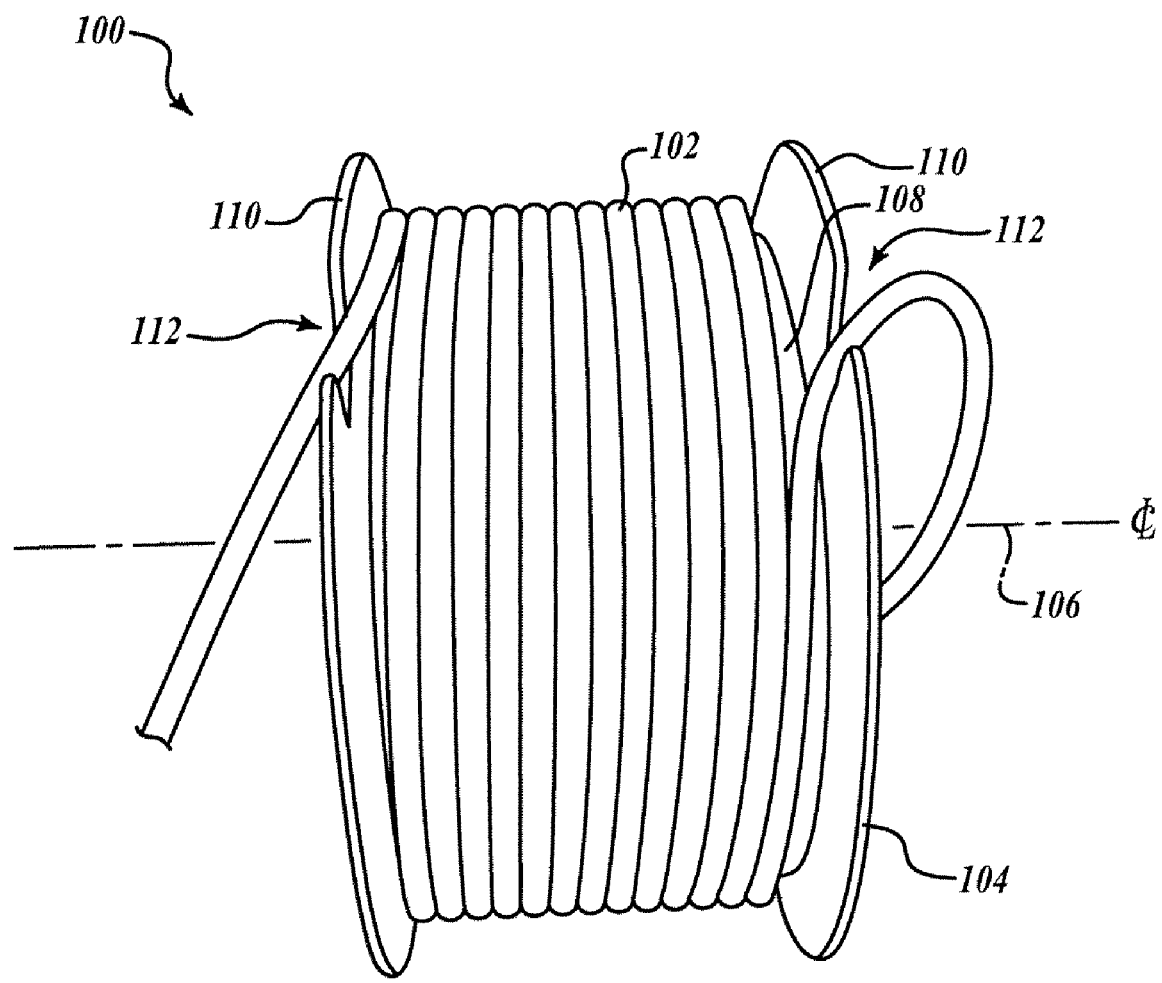
FIG. 1 is a perspective view of a fiber optic coil assembly having a wound fiber optic coil on a mandrel according to an illustrated embodiment of the invention.

FIG. 1 shows a fiber optic coil assembly 100 having a fiber optic coil 102 wound on a spool or mandrel 104 according to an illustrated embodiment. In one embodiment, the fiber optic coil assembly 100 is used in a strategic navigational grade gyroscope, such as a fiber optic gyroscope. The fiber optic coil 102 is wound on the spool 104 such that a "jog zone" or "cross-over zone" is at least substantially eliminated. As a reminder, the jog zone is described in the background section above and also described in U.S. Pat. No. 6,005,665. The fiber optic coil 102 is wound about a spool axis 106. The winding process of the fiber optic coil 102 and the elimination of the jog zone are described in detail below.

The mandrel 104 includes a substantially cylindrical body 108 extending between radially extending side flanges 110. Each flange 110 includes a flange cutout region 112 for receiving portions of the fiber optic coil 102 during a winding process. In one embodiment, the mandrel 104 may be removed from the fiber optic coil assembly 100 after the fiber optic coil 102 has been completely wound on the body 108 and after the wound fiber optic coil 102 has sufficiently been sealed and cured with an infused resin material. By way of example, the mandrel 104 may be made of a material, for example, with a melting point that allows it to be melted at a temperature that would not melt the coil 102.

Figure 2:
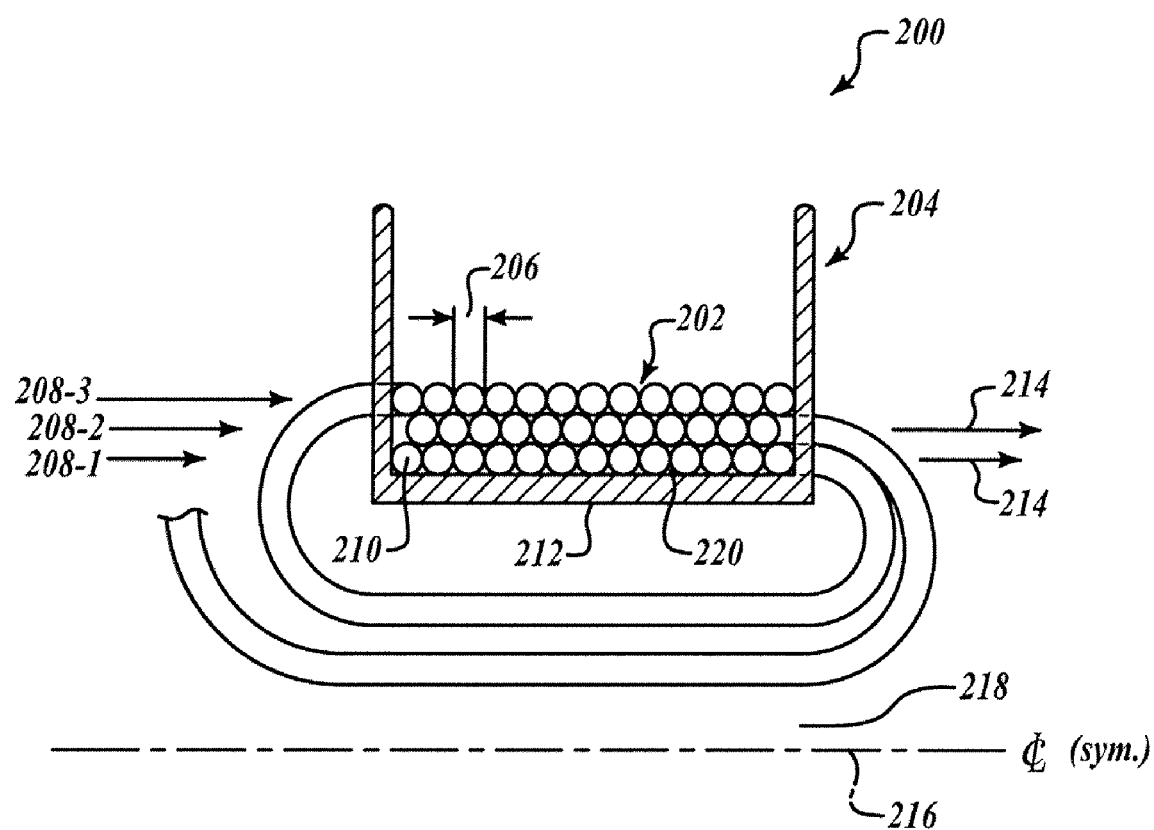
FIG. 2 is a cross-sectional view of another fiber optic coil assembly having a wound fiber optic coil with multiple layers located on a mandrel according to an illustrated embodiment of the invention.

FIG. 2 shows a cross-section of another fiber optic coil assembly 200 having a fiber optic coil 202 wound on a spool or mandrel 204 such that each coil diameter 206 in a layer or row 208, as viewed in cross-section, is substantially parallel to an adjacent coil diameter 206. The number or rows 208 and the number of coil diameters 206 in a particular row depends on the type of winding pattern desired.

The winding process and thus the elimination of the jog zone may be accomplished by winding the fiber optic coil 202 from two separate feeder spools (not shown). A midpoint 210 of the fiber optic coil 202 is located on the mandrel 204 and the coil 202 is wound from a first feeder spool (not shown) in a first rotational direction (e.g., clockwise (CW) or counter-clockwise (CCW)) and in a first linear direction (e.g., left-to-right or right-to-left) to form the first or initial row 208a, located proximate a cylindrical body 212 of the mandrel 204. By way of example, the winding of the coil 202 in the illustrated embodiment is commenced on the left-hand side of the mandrel 204, thus the coil 202 is wound from left-to-right as indicated by arrow 214. Hence, the linear direction 214 of the wound coil 202 is substantially parallel to a centerline axis 216 of the mandrel 204. Once all the coil diameters 206 are in place to form the first row 208a, the coil 202 is then fed or routed through the flange cutout region 112 (FIG. 1), through a central opening 218 of the mandrel 204, and then held stationary while a second row 208b is formed. An amount of fiber spacing 220, which may be determined by a desired winding pattern, may be maintained during the winding process.

After the first row 208a has been formed, a second feeder spool (not shown) winds the coil 202 in an opposite rotational direction, but in the same linear direction 214 as the first row 208a. Preferably, the second row 208b is wound in the grooves formed by the first row 208a. Similar to the first row 208a, the second row 208b is wound from one flange to the opposing flange across the cylindrical body 212 of the mandrel 204. For purposes of clarity, the coil diameters 206 of the first row 208a are shown without any cross-sectional pattern while the coil diameters 206 of the second row 208b are shown as cross-hatched. As noted above, the different cross-sectional pattern represent that the first row 208a and the second row 208b are wound in opposite rotational directions. Upon completion of the second row 208b, the coil 202 is fed or routed through the flange cutout region 112 (FIG. 1) and then through the central opening 218 of the mandrel 204. At this juncture a third row 208c may be formed in the same manner as the first row 208a, then a fourth row (not shown) may be formed in the same manner as the second row 208b, and on. Alternatively stated, the wound layers 208 may be repeated until a desired numbers of layers 208 is achieved. The routing of the coil 202 may be controlled to ensure removability of at least the cylindrical body 212 of the mandrel 204. Advantageously, the resulting fiber optic coil assembly 200 includes a jog zone free fiber optic coil 202.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A fiber optic coil assembly comprising:
   a first layer of a continuous fiber optic coil cylindrically wound in a first rotational direction and in a first linear direction, the first layer having coil diameters located substantially parallel to one another and extending substantially over the first linear direction, the first layer having a first lead portion extending from an end of the first layer and back through a cylindrical opening defined by the cylindrically wound first layer; and
   a second layer of a continuous fiber optic coil cylindrically wound in a second rotational direction and in the first linear direction, the second layer having coil diameters located substantially parallel to one another and extending substantially over a second linear direction and further located on the first layer, the second layer having a second lead portion extending from an end of the second layer and back through a cylindrical opening defined by the cylindrically wound layers.

2. The fiber optic coil assembly of claim 1, wherein the first rotational direction is clockwise and the second rotational direction is counterclockwise.

3. The fiber optic coil assembly of claim 1, wherein the first rotational direction is counterclockwise and the second rotational direction is clockwise.

4. The fiber optic coil assembly of claim 1, wherein the first linear direction is substantially parallel to a cylindrical axis formed by the cylindrically wound first layer.

5. The fiber optic coil assembly of claim 1, wherein the second layer is wound on top of and recessed in grooves formed by the first layer.

6. The fiber optic coil assembly of claim 1, further comprising:
   a removable cylindrical mandrel having a cylindrical body defining a cylindrical channel.

7. The fiber optic coil assembly of claim 6, wherein the removable cylindrical mandrel further includes radial flanges extending from ends of the cylindrical body.

8. The fiber optic coil assembly of claim 7, wherein at least one radial flange includes a cutout region sized to receive the first and second lead portions of the fiber optic coil.

9. The fiber optic coil assembly of claim 8, wherein the cutout region is at least as large as the fiber optic coil diameter.

10. A method for winding a fiber optic coil assembly, the method comprising:
    cylindrically winding a first layer of a continuous fiber optic coil in a first rotational direction and in a first linear direction such that coil diameters comprising the first layer are located substantially parallel to one another and extend substantially over the first linear direction;
    routing a first lead portion of the fiber optic coil from an end of the first layer through a cylindrical opening defined by the cylindrically wound first layer; cylindrically winding a second layer of the continuous fiber optic coil in a second rotational direction and in a second linear direction such that coil diameters comprising the second layer are located substantially parallel to one another and extend substantially over the first linear direction; and
    routing a second lead portion of the fiber optic coil from an end of the second layer through the cylindrical opening defined by the cylindrically wound first layer.

11. The method of claim 10, wherein cylindrically winding the second layer of the continuous fiber optic includes locating the coil diameters of the second layer in grooves formed by the first layer.

12. The method of claim 10, further comprising:
    heating a removable mandrel located within the cylindrical opening defined by the cylindrically wound first layer.

13. The method of claim 12, wherein heating the removable mandrel includes melting out at least a cylindrical body of the cylindrical mandrel from the cylindrical opening.

14. The method of claim 13, wherein heating the removable mandrel includes curing a resin material infused within and on the fiber optic coil.

15. A fiber optic gyroscope having a fiber optic coil assembly, the gyroscope comprising:
    a fiber optic coil having a first layer and a second layer, the first layer cylindrically wound in a first rotational direction and in a first linear direction, the first layer having coil diameters located substantially parallel to one another and extending substantially over the first linear direction, the first layer having a first lead portion extending from an end of the first layer and back through a cylindrical opening defined by the cylindrically wound first layer, and
    the second layer cylindrically wound in a second rotational direction and in the first linear direction, the second layer having coil diameters located substantially parallel to one another and extending substantially over a second linear direction and further located on the first layer, the second layer having a second lead portion extending from an end of the second layer and back through a cylindrical opening defined by the cylindrically wound first layer.

16. The fiber optic gyroscope of claim 15, wherein the first rotational direction is clockwise and the second rotational direction is counterclockwise.

17. The fiber optic gyroscope of claim 15, wherein the first rotational direction is counterclockwise and the second rotational direction is clockwise.

18. The fiber optic gyroscope of claim 15, wherein the first linear direction is substantially parallel to a cylindrical axis formed by the cylindrically wound first layer.

19. The fiber optic gyroscope of claim 15, wherein the second layer is wound on top of and recessed in grooves formed by the first layer.

20. The fiber optic gyroscope of claim 15, further comprising:
    a removable cylindrical mandrel having a cylindrical body defining a cylindrical channel, the cylindrical body located within the cylindrical opening defined by the cylindrically wound first layer.

* * * * *